(12) United States Patent
Bonk et al.

(10) Patent No.: US 12,103,443 B2
(45) Date of Patent: Oct. 1, 2024

(54) VEHICLE AND OCCUPANT SUPPORT FOR A VEHICLE

(71) Applicant: Faurecia Automotive Seating, LLC, Auburn Hills, MI (US)

(72) Inventors: Jeffery T. Bonk, Chesterfield, MI (US); Robert C. Fitzpatrick, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 369 days.

(21) Appl. No.: 17/571,788

(22) Filed: Jan. 10, 2022

(65) Prior Publication Data
US 2023/0219468 A1 Jul. 13, 2023

(51) Int. Cl.
*B60N 2/30* (2006.01)
*B60N 2/06* (2006.01)

(52) U.S. Cl.
CPC .......... *B60N 2/3047* (2013.01); *B60N 2/3011* (2013.01); *B60N 2/3022* (2013.01); *B60N 2/3093* (2013.01); *B60N 2/065* (2013.01)

(58) Field of Classification Search
CPC .. B60N 2/3047; B60N 2/3045; B60N 2/3056; B60N 2/3011; B60N 2/3022; B60N 2/3093; B60N 2/2209; B60N 2/3065; B60N 2/305; B60N 3/002; B60P 3/423; B60R 7/04; B60R 7/00; B60R 7/08; B60R 2011/0024
USPC ............ 296/65.09, 65.01, 65.05, 37.16, 37.5
See application file for complete search history.

(56) References Cited

U.S. PATENT DOCUMENTS

| 1,715,308 A * | 5/1929 | Richardson .............. B60N 2/34 296/37.16 |
| 1,806,882 A * | 5/1931 | Richardson .............. B60N 2/20 296/37.16 |
| 5,529,378 A * | 6/1996 | Chaban .............. B60N 2/01508 297/331 |
| 5,800,015 A * | 9/1998 | Tsuchiya ................ B60N 2/085 248/65 |
| 5,951,104 A * | 9/1999 | Tsuchiya .................. B60N 2/06 296/65.09 |
| 6,702,355 B1 * | 3/2004 | Price ...................... B60R 5/045 296/65.09 |
| 7,611,200 B2 | 11/2009 | Jovicevic |
| 8,091,945 B2 | 1/2012 | Hancock |

(Continued)

FOREIGN PATENT DOCUMENTS

| DE | 102013018670 A1 * | 5/2015 | ............. B60J 5/101 |
| FR | 2858953 A1 * | 2/2005 | ............. B60N 2/143 |

(Continued)

OTHER PUBLICATIONS

Kim (KR 20020095494 A), machine translation (Year: 2002).*
Michelin (FR 2858953 A1), machine translation (Year: 2005).*
Furumura (JP S6144038 A), machine translation (Year: 1986).*

*Primary Examiner* — Amy R Weisberg
*Assistant Examiner* — Wenwei Zhuo
(74) *Attorney, Agent, or Firm* — Barnes & Thornburg LLP (57) ABSTRACT

A rear row occupant support for a vehicle includes a seat bottom arranged to overlie a floor of the vehicle, a seat back coupled to the seat bottom and arranged to extend upwardly away from the floor, and a seat mode-change system that allows the rear occupant support to adjust its position to provide a storage space.

4 Claims, 3 Drawing Sheets

(56) References Cited

U.S. PATENT DOCUMENTS

| | | | |
|---|---|---|---|
| 8,414,049 B2 * | 4/2013 | Parker | B60R 5/045 |
| | | | 296/37.16 |
| 10,300,832 B1 | 5/2019 | Folks | |
| 10,899,253 B2 | 1/2021 | Seibold | |
| 2005/0104431 A1 | 5/2005 | Saberan | |
| 2005/0146186 A1 * | 7/2005 | Kinnou | B60N 2/28 |
| | | | 297/331 |
| 2006/0103174 A1 * | 5/2006 | Queveau | B60N 2/3065 |
| | | | 297/378.12 |
| 2008/0122279 A1 * | 5/2008 | Park | B60N 2/0818 |
| | | | 297/331 |
| 2013/0147226 A1 * | 6/2013 | Cao | B60N 2/36 |
| | | | 296/37.16 |
| 2013/0320729 A1 * | 12/2013 | Cooley | B60N 2/12 |
| | | | 297/331 |
| 2020/0086768 A1 * | 3/2020 | Line | B60N 2/143 |

FOREIGN PATENT DOCUMENTS

| | | | | |
|---|---|---|---|---|
| FR | 2906195 A1 * | 3/2008 | | B60N 2/065 |
| GB | 2058682 A * | 4/1981 | | B60N 2/3022 |
| JP | S6144038 A * | 3/1986 | | |
| JP | H01154045 U * | 10/1989 | | |
| JP | H0338558 Y2 * | 8/1991 | | |
| KR | 20020095494 A * | 12/2002 | | |
| SU | 770875 A1 * | 10/1980 | | |
| WO | 2012083167 A1 | 6/2012 | | |

\* cited by examiner

VEHICLE AND OCCUPANT SUPPORT FOR A VEHICLE

BACKGROUND

The present disclosure relates to occupant supports, and particularly to rear occupant supports. More particularly, the present disclosure relates to a rear occupant support that is reconfigurable.

SUMMARY

According to the present disclosure, a vehicle includes a vehicle frame, a front occupant support, and a rear occupant support. The vehicle frame defines a passenger compartment and includes a floor and a rear wall. The rear occupant support is reconfigurable relative to the rest of the vehicle to provide one or more storage spaces within the passenger compartment. The rear occupant support includes a seat bottom and a seat back. The seat bottom is normally arranged generally horizontal relative to the floor, and the seat back extends upwardly from the seat bottom and the floor to provide a seating surface for an occupant in a passenger support mode.

In illustrative embodiments, the rear occupant support further includes a seat mode-change system configured to allow movement of the rear occupant support relative to the floor and the rear wall between the passenger support mode, a first storage mode, and a second storage mode. The seat mode-change system includes a foundation track, a foundation mount, and a foundation motion-blocker. The foundation track extends longitudinally away from the rear wall toward the front occupant support. The foundation mount is coupled to the foundation track, the seat bottom, and the seat back. The foundation motion-blocker is configured to selectively block or allow forward and aft movement of the rear occupant support relative to the floor.

In illustrative embodiments, the rear occupant support is movable along the foundation track between a slid-back position, a slid-forward position, and a plurality of intermediate positions between the slid-back and slid-forward positions. In the slid-back position, the seat back is in confronting relation to the rear wall. In the slid-forward positon, the seat bottom is in confronting relation to the front occupant support.

In illustrative embodiments, the rear occupant support is movable between the slid-back positon and the slid-forward position to arrange the rear occupant support in either the first storage mode or the second storage mode. The first storage mode is configured to provide a forward storage space between the seat bottom and the front occupant support. In the first storage mode, the seat bottom is oriented generally in a vertical direction relative to the floor and is positioned in confronting relation to the seat back, while the seat back is arranged in confronting relation with the rear wall. The second storage mode is configured to provide a rear storage space between the seat back and the rear wall. In the second storage mode, the seat bottom is oriented generally in a vertical direction relative to the floor and is positioned in confronting relation to both the seat back of the rear occupant support and the front occupant support while the seat back is spaced apart from the rear wall to provide the rear storage space between the rear wall and the seat back.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 2 is a side elevation and diagrammatic view of the portion of the vehicle shown in FIG. 1 showing that the seat mode change system includes a foundation track coupled to a floor of the vehicle frame and extending longitudinally away from a rear wall of the vehicle frame toward the front occupant support, a foundation mount coupled to the foundation track, the seat bottom, and the seat back, and a foundation motion-blocker configured to block forward and aft movement of the foundation mount along the foundation track, and showing the rear occupant support in the first storage mode in which the seat bottom is arranged generally vertically relative to the floor in confronting relation to the seat back to provide a forward storage space between the seat bottom and the front occupant support, in contrast to the passenger support mode as shown in FIG. 1 in which the seat bottom is arranged generally horizontally relative to the floor;

DETAILED DESCRIPTION

Figure 1:
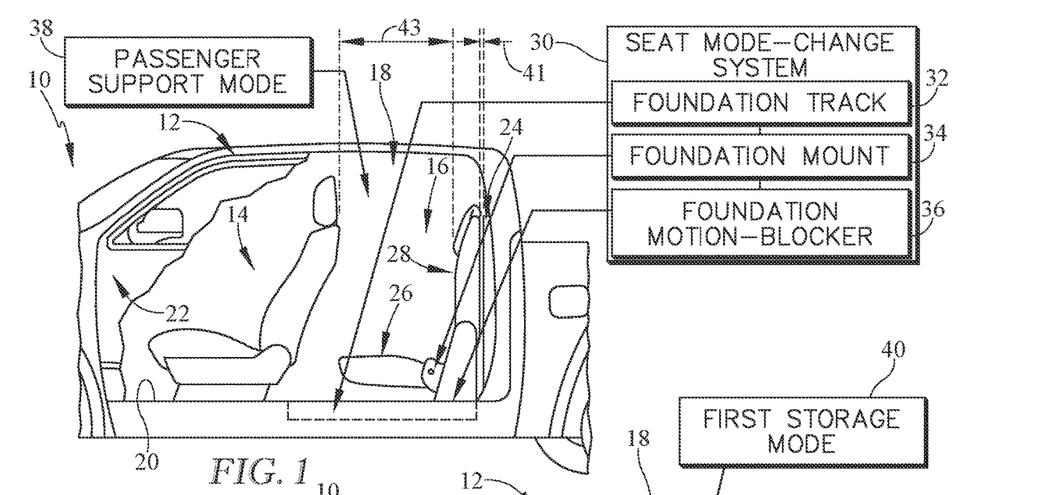
FIG. 1 is a side elevation and diagrammatic view of a portion of a vehicle with portions cut away to show that the vehicle includes a vehicle frame, a front occupant support, and a rear occupant support including a seat bottom and a seat back that cooperate to provide a seating space for an occupant when the rear occupant support is in a passenger support mode, and showing that the rear occupant support further includes a seat mode-change system that is configured to allow the rear occupant support to change from the passenger support mode to a first storage mode, as shown in FIG. 2, and a second storage mode, as shown in FIG. 3.

A vehicle 10 in accordance with the present disclosure includes a vehicle frame 12, a front occupant support 14, and a rear occupant support 16 as shown in FIG. 1. The vehicle frame 12 is configured to define a passenger compartment 18 and includes a floor 20, a front dash 22 providing a front boundary of the passenger compartment 18, and a rear wall 24 providing a rear boundary of the passenger compartment 18. The front occupant support 14 is configured to support an occupant of the vehicle 10, for example, and is positioned directly aft of the front dash 22. The rear occupant support 16 is also configured to support an occupant in the vehicle 10 and may be located directly forward of the rear wall 24 to lie between the front occupant support 14 and the rear wall 24.

Figure 2:
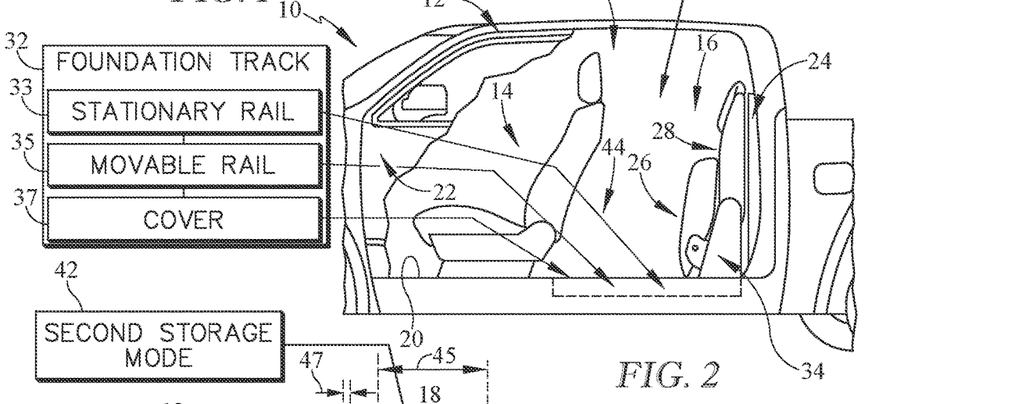
Figure 3:
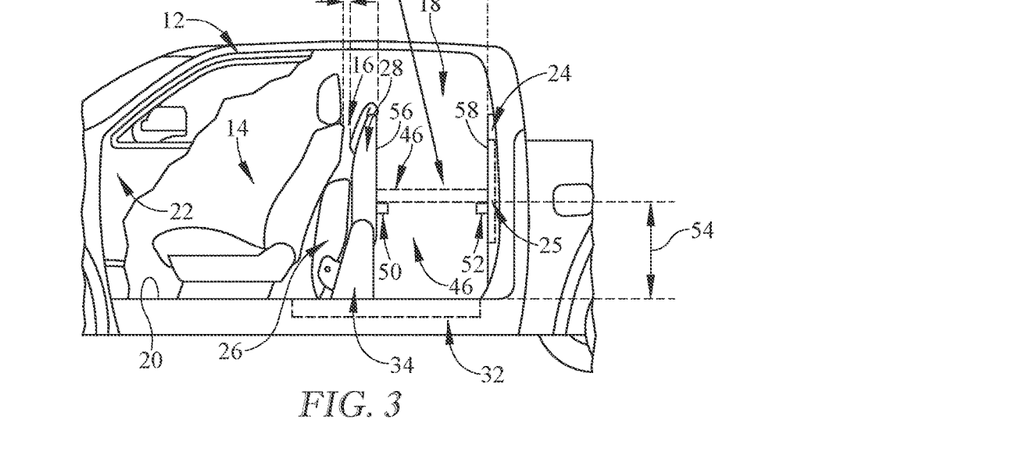
FIG. 3 is a side elevation and diagrammatic view of a portion of the vehicle of FIG. 1 showing the rear occupant support in the second storage mode in which the seat bottom is arranged in confronting relation to the front occupant support and the seat back is spaced apart from the rear wall to provide a rear storage space between the seat back and the rear wall.

The rear occupant support 16 is reconfigurable relative to the rest of the vehicle 10 to provide one or more storage spaces within the passenger compartment 18 of the vehicle 10 as shown in FIGS. 1-3. The rear occupant support 16 includes a seat bottom 26, a seat back 28, and a seat mode-change system 30. The seat bottom 26 extends generally horizontally relative to and above the floor 20. The seat back 28 is coupled to the seat bottom 26 and is arranged to extend upwardly away from the floor 20 and the seat bottom 26 in front of the rear wall 24. The seat mode-change system 30 is configured to couple the rear occupant support 16 to the floor 20 and the rear wall 24 and allows the seat bottom 26 and the seat back 28 to move relative to the rest of the vehicle 10 to provide the one or more storage spaces in the passenger compartment 18.

The seat mode-change system 30 is also configured to allow movement of the rear occupant support 16 relative to the floor 20 and the rear wall 24 between a passenger support mode 38, as shown in FIG. 1, a first storage mode 40, as shown in FIG. 2, and a second storage mode 42, as shown in FIG. 3. The passenger support mode 38 is configured to support an occupant of the vehicle 10, for example. The first storage mode 40 is configured to provide a forward storage space 44 between the seat bottom 26 and the front occupant support 14. The second storage mode 42 is configured to provide a rear storage space 46 between the seat back 28 and the rear wall 24.

The seat mode-change system 30 includes a foundation track 32, a foundation mount 34, and a foundation motion-blocker 36 as shown in FIG. 1. The foundation track 32 is coupled to the floor 20 and is arranged to extend longitudinally away from the rear wall 24 toward to the front occupant support 14. The foundation mount 34 is coupled to the foundation track 32, the seat bottom 26, and the seat back 28. The foundation motion-blocker 36 is configured to selectively lock the foundation mount 34 to the foundation track 32 to block movement of the foundation mount 34 and, hence, the rear occupant support 16 relative to the floor 20.

The foundation motion-blocker 36 is configured to change between a locked arrangement and unlocked arrangement as demonstrated in FIGS. 1-3. The locked arrangement blocks forward and aft movement of the foundation mount 34 along the foundation track 32. The unlocked arrangement allows forward and aft movement of the foundation mount 34 along the foundation track 32. In some embodiments, the foundation motion-blocker 36 is operated manually by a user to move the rear occupant support 16 forward and aft along the foundation track 32. In other embodiments, the foundation motion-blocker 36 is powered by an electric motor in response to user inputs to move the rear occupant support 16 forward and aft along the foundation track 32.

The foundation track 32 includes at least one stationary rail 33, at least one movable rail 35, and a cover 37 as shown in FIG. 2. The at least one stationary rail 33 is inset in the floor 20 and securely coupled to the floor 20. The at least one movable rail 35 is also inset in the floor 20 and coupled to the foundation mount 34, and is configured to slide along the at least one stationary rail 33 to longitudinally move the rear occupant support 16 between a slid-back positon and a slid-forward position. The cover 37 is arranged generally horizontally relative to the floor 20 over the at least one stationary rail 33 and the at least one movable rail 35 and is generally flushed with the floor 20 to block access to the rails 33, 35. In some embodiments, the at least one stationary rail 33 and the at least one movable rail 35 may include two stationary rails 33 and two movable rails 35 divided into pairs and on opposing sides of the rear occupant support 16.

In the passenger support mode 38, the seat bottom 26 is arranged generally horizontally relative to the floor 20 and the seat back 28 extends upwardly away from the seat bottom 26 and the floor 20 as shown in FIG. 1. The rear occupant support 16 is movable along the foundation track 32 between the slid-back position and the slid-forward position. In the slid-back position, the seat back 28 is in confronting relation to the rear wall 24. In the slid-forward position, the seat bottom 26 is in confronting relation to the front occupant support 14. The foundation motion-blocker 36 may be configured to retain the rear occupant support 16 in a plurality of intermediate positions between the slid-back position and the slid-forward position.

The rear occupant support 16 is also movable between the slid-back position adjacent to the rear wall 24 and the slid-forward position adjacent to the front occupant support 14 to arrange the rear occupant support 16 in either the first storage mode 40 or the second storage mode 42 as shown in FIGS. 2 and 3. In the first storage mode 40, the seat bottom 26 is arranged generally vertically relative to the floor 20 and is in confronting relation to the seat back 28. In the second storage mode 42, the rear occupant support 16 is configured as in the first storage mode 40, and additionally the seat bottom 26 is arranged in confronting relation to the front occupant support 14 and the seat back 28 is spaced apart from the rear wall 24 to provide the rear storage space 46.

In the passenger support mode 38 the rear occupant support 16 is spaced apart from the rear wall 24 by a first distance 41 and from the front occupant support 14 by a second distance 43 greater than the first distance 41 as shown in FIG. 1. In other embodiments, the first distance 41 could be equal to or greater than the second distance 43 as suggested in FIG. 7. In the second storage mode 42, the rear occupant support 16 is spaced apart from the rear wall 24 by a third distance 45 and from the front occupant support 14 by a fourth distance 47 less than the third distance 45 as shown in FIG. 3. The rear occupant support 16 may be changed to the first storage mode 40 prior to moving to the second storage mode 42 so that the third and fourth distances 45, 47 can be established in the second storage mode 42.

The rear occupant support 16 may also include a storage shelf 48 coupled between the seat back 28 and the rear wall 24 when the rear occupant support 16 is in the second storage mode as shown in FIGS. 3-6. The storage shelf 48 is configured to provide multiple sub-spaces of the rear storage space 46. When not in use, the storage shelf 48 may be stored in a designated compartment 25 in the rear wall 24, under the front occupant support 14 or seat bottom 26 of the rear occupant support 16, or elsewhere in the vehicle 10. The storage shelf 48 may be moved to a use position between the seat back 28 and the rear wall 24 manually by a user or, in some embodiments, may be controlled by an electronic motor via user input. In other embodiments, the storage shelf 48 may be coupled between the seat back 28 and the rear wall 24 when the rear occupant support 16 is in the passenger support mode.

The storage shelf 48 may be placed along a first shelf support 50 and a second shelf support 52 as shown in FIG. 3. The first shelf support 50 is fixed to a rearward-facing surface 56 of the seat back 28. The second shelf support 52 is fixed to a forward-facing surface 58 of the rear wall 24. The first and second shelf supports 50, 52 are aligned vertically to each other such that when the storage shelf 48 is positioned between the seat back 28 and the rear wall 24, the storage shelf 48 is substantially level and/or parallel to the floor 20. In some embodiments, the first and second shelf supports 50, 52 may be removable from the rearward-facing surface 56 and the forward-facing surface 58 when the storage shelf 48 is not in use. In other embodiments, the first and second shelf supports 50, 52 may be repositionable along the rearward-facing surface 56 and the forward-facing surface 58 to adjust a vertical height 54 of the storage shelf 48 relative to the floor 20. In some embodiments, the first shelf support 50 and the second shelf support 52 is a ledge or notch formed into the seat back 28 and rear wall 24, respectively.

Figure 4:
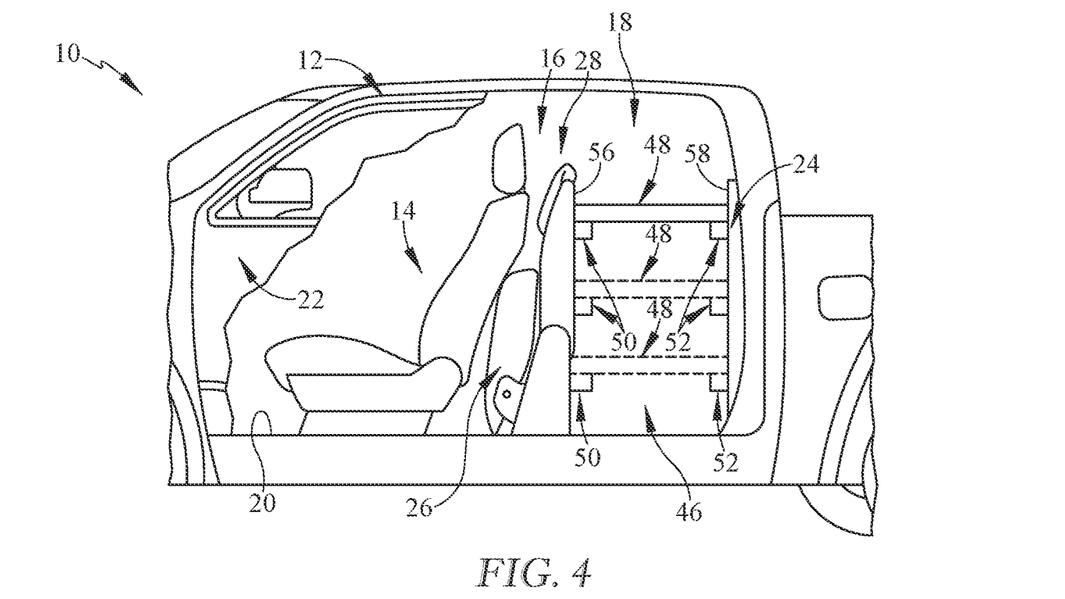
FIG. 4 is a side elevation and diagrammatic view of a portion of the vehicle of FIG. 3 showing that the rear occupant support further includes a storage shelf coupled between the seat back and the rear wall and suggesting that the storage shelf is repositionable along a first plurality of vertically-spaced shelf supports arranged along a rearward-facing surface of the seat back and a second plurality of vertically-spaced shelf supports arranged along a forward-facing surface of the rear wall.

In some embodiments, the seat back 28 includes a first plurality of vertically-spaced shelf supports 50 and the rear wall includes a second plurality of vertically-spaced shelf supports 52 as shown in FIG. 4. While FIG. 4 shows each plurality of vertically-spaced shelf supports 50, 52 having three vertically-spaced shelf supports, in other embodiments, each plurality of vertically-spaced shelf supports 50, 52 may include two vertically spaced shelf supports, or more than three vertically-spaced shelf supports. In other embodiments, more than one storage shelf 48 may be placed on the first and second plurality of vertically-spaced shelf supports 50, 52 to increase the number of sub-spaces within the rear storage space 46.

Figure 5:
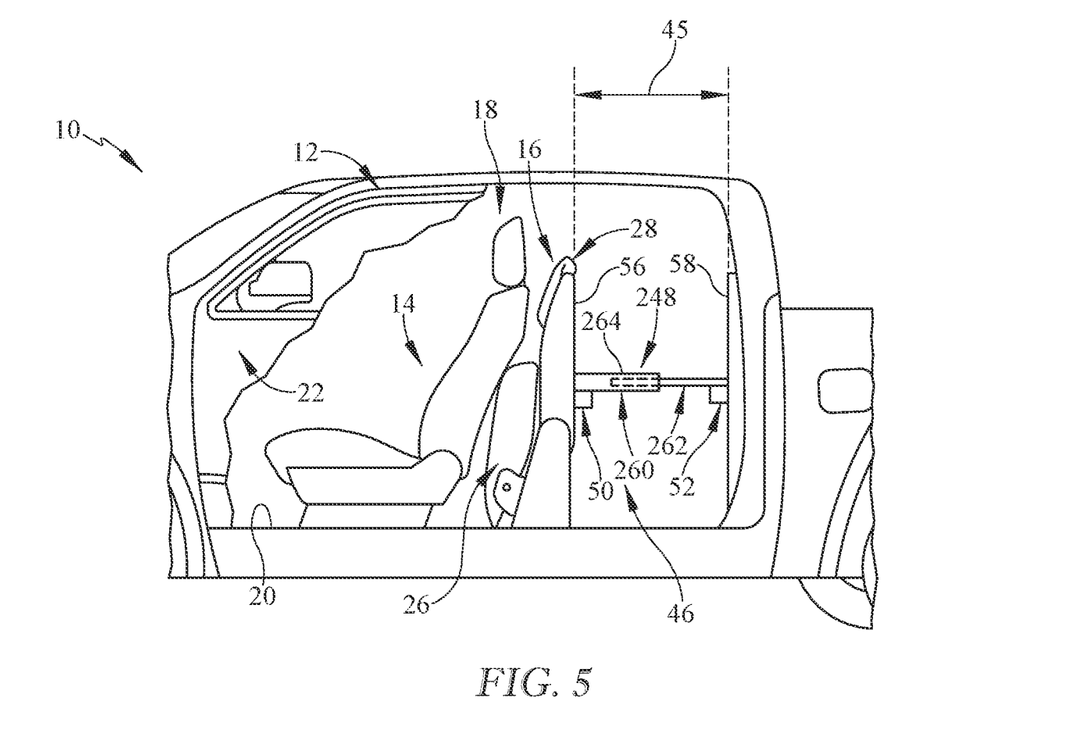
FIG. 5 is a side elevation and diagrammatic view of a portion of the vehicle of FIG. 3 showing the storage shelf coupled between the seat back and the rear wall and showing that the storage shelf includes a first shelf section and a second shelf section slidable relative to the first shelf section to increase and decrease a length of the storage shelf.

Another embodiment of a storage shelf 248 for use with the rear occupant support 16 is shown in FIG. 5. The storage shelf 248 may include a first shelf section 260 and a second shelf section 262 that is movable relative to the first shelf section 260 to provide a variable-length shelf surface 264 as shown in FIG. 5. In the present embodiment, the second shelf section 262 is slidable relative to the first shelf section 260 in order to adjust the variable-length shelf surface 264. In other embodiments, the second shelf section 262 could be pivotable relative to the first shelf section 260 to adjust the variable-length shelf surface 264. In some embodiments, the storage shelf 248 may include additional shelf sections which are movable relative to the first shelf section 260 and/or the second shelf section 262. In some embodiments, the second shelf section 262 is at least partially received in a space formed in the first shelf section 260 so as to provide a telescopic storage shelf 248.

The variable-length shelf surface 264 of the storage shelf 48 is based on the third distance 45 between the seat back 28 and the rear wall 24 when the rear occupant support 16 is in the second storage mode 42 as suggested in FIG. 5. The third distance 45 is determined by the position of the rear occupant support 16 along the foundation track 32. To adjust the position of the rear occupant support 16 and increase or decrease the third distance 45, the foundation motion-blocker 36 is adjusted from the locked arrangement to the unlocked arrangement to allow forward and aft movement of the rear occupant support 16 along the foundation track 32. The foundation motion-blocker 36 is then adjusted to the locked arrangement to secure the rear occupant support 16 along the foundation track 32 to establish the new third distance 45. The variable-length shelf surface 264 of the storage shelf 248 is then adjusted to fit the length of the third distance 45. In other embodiments, the variable-length shelf surface 264 of the storage shelf 48 may be based on the first distance 41 between the seat back 28 and the rear wall 24 when the rear occupant support 16 is in the passenger support mode 38.

Figure 6:
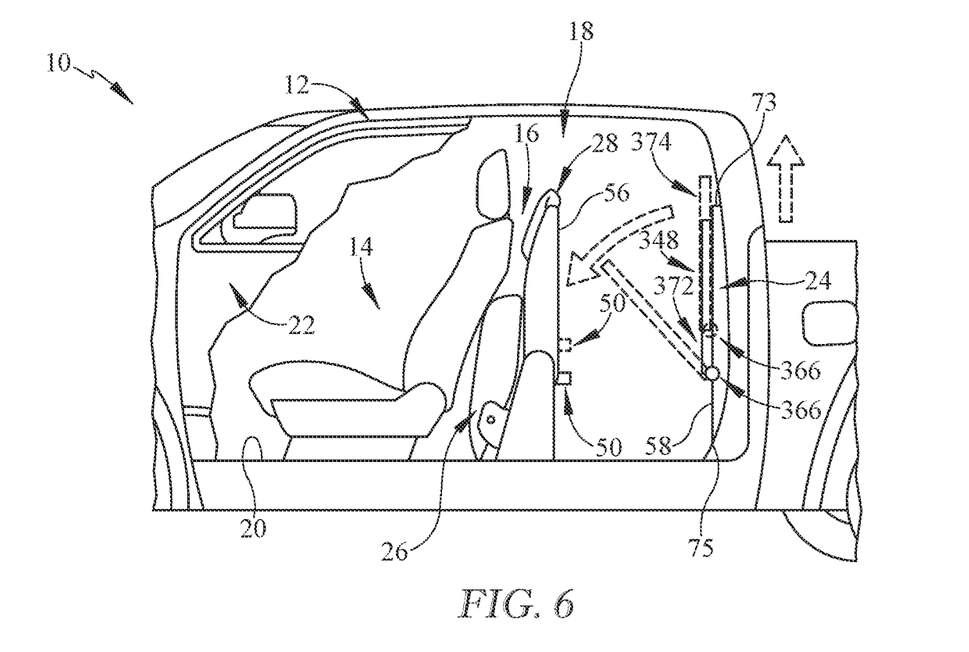
FIG. 6 is a side elevation and diagrammatic view of a portion of the vehicle of FIG. 3 showing the storage shelf mounted to the rear wall for pivotable movement relative to the rear wall from a stored position to a deployed position and showing that a first end of the storage shelf is slidable relative to the rear wall to adjust a height of the first end relative to the floor.

Another embodiment of a storage shelf 348 for use with the rear occupant support 16 in which the storage shelf 348 is movable relative to the rear wall 24 and the floor 20 along the forward-facing surface 58 of the rear wall 24 is shown in FIG. 6. The storage shelf 348 may include a first end 372 and a second end 374. The first end 372 is mounted to the forward-facing surface 58 of the rear wall 24 about a shelf pivot axis 366. The storage shelf 348 is configured to pivot about the shelf pivot axis 366 from a stored position to a deployed position. The second end 374 is opposite the first end 372 and engages the shelf support 50 on the seat back 28 when the storage shelf 348 is in the deployed position.

In the stored position, the storage shelf 348 extends generally parallel with the rear wall 24. In the deployed position, the storage shelf 348 extends between and interconnects the rear wall 24 and the seat back 28. In some embodiments, the movement of the storage shelf 348 from the storage position to the deployed position and back to the storage position may be done manually by a user. In other embodiments, this movement may be controlled by an electronic motor via user input.

The first end 372 of the storage shelf 348 may be moved along the forward-facing surface 58 of the rear wall 24 to vertically adjust the shelf pivot axis 366. The shelf pivot axis 366 may be adjusted to align with the shelf support 50. In some embodiments, this adjustment of the shelf pivot axis 366 may be done manually by a user or, in other embodiments, may be controlled by an electronic motor via user input. The shelf support 50 is parallel to the shelf pivot axis 366 such that the storage shelf 348 is substantially level and/or parallel to the floor 20 when in the deployed position. As described above, in some embodiments, the shelf support 50 may be removable from the rearward-facing surface 56 of the seat back 28 when the storage shelf 348 is not in use. In other embodiments, the shelf support 50 may be repositionable along the rearward-facing surface 56 to align with the adjusted shelf pivot axis 366 in order for the storage shelf 348 to be substantially level and/or parallel to the floor 20. In alternative embodiments, the shelf support 50 could include a plurality of vertically-spaced shelf supports 50.

Figure 7:
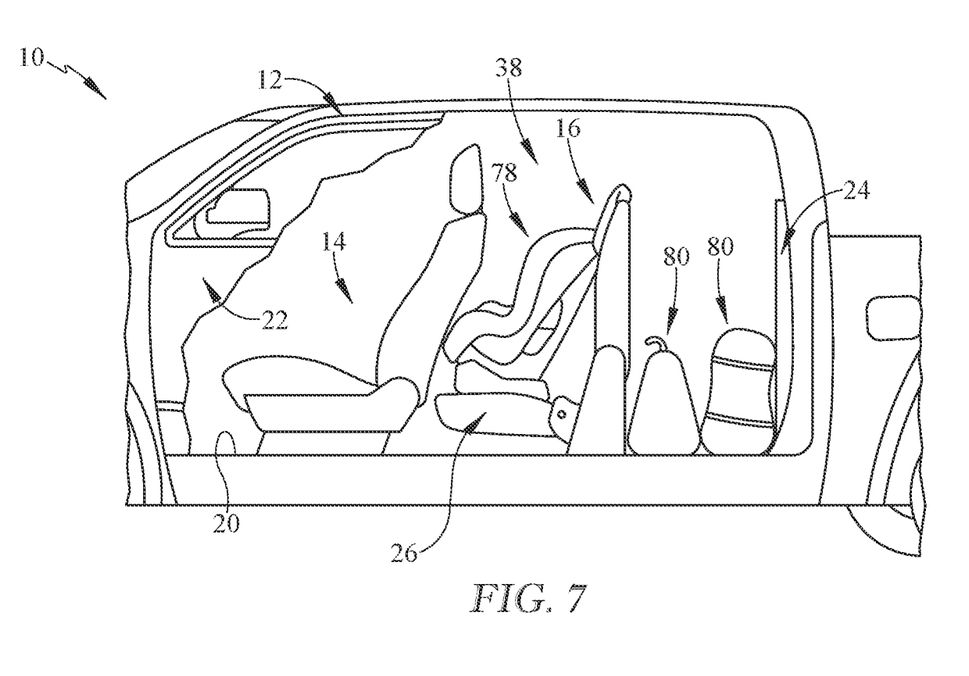
FIG. 7 is a side elevation and diagrammatic view of a portion of the vehicle of FIG. 1 showing the rear occupant support in the passenger support mode supporting a child restraint and slid forward along the foundation track to provide a rear storage space between the seat back and the rear wall.

The rear occupant support 16 may be configured to support a child restraint 78 when in the passenger support mode 38 as shown in FIG. 7. In the present embodiment, the rear occupant support 16 is in an intermediate position between the slid-back position and the slid-forward position to provide both rear storage space 46 between the seat back 28 and the rear wall 24 for luggage 80 and access to the child restraint 78 by an occupant seated in the front occupant support 14.

The following numbered clauses include embodiments that are contemplated and non-limiting:

Clause 1. A vehicle includes a vehicle frame including a floor, a front dash, and a rear wall to define a passenger compartment between the front dash and the rear wall and above the floor.

Clause 2. The vehicle of clause 1, any other clause, or any suitable combination of clauses, further includes a front occupant support positioned directly aft of the front dash within the passenger compartment, and Clause 3. The vehicle of clause 2, any other clause, or any suitable combination of clauses, further includes a rear occupant support positioned between directly forward of the rear wall between the front occupant support and the rear wall within the passenger compartment, the rear occupant support including a seat bottom arranged to overlie the floor, a seat back coupled to the seat bottom and arranged to extend upwardly away from the floor in front of the rear wall, and a seat mode-change system configured to couple the rear occupant support to at least one of the floor and the rear wall, the seat mode-change system including a foundation track coupled to the floor and arranged to extend longitudinally away from the rear wall toward the front occupant support, a foundation mount coupled to the foundation track and at least one of the seat bottom and the seat back, and a foundation motion-blocker configured to block forward and aft movement of the foundation mount along the foundation track in a locked arrangement and allow forward and aft movement of the foundation mount along the foundation track in an unlocked arrangement, Clause 4. The vehicle of clause 3, any other clause, or any suitable combination of clauses, wherein the seat mode-change system is configured to allow movement of the rear occupant support relative to the floor and the rear wall between a passenger support mode, in which the seat bottom is arranged generally horizontally relative to the floor and the seat back extends upwardly away from the seat bottom and the floor, to a first storage mode, in which the seat bottom is arranged generally vertically relative to the floor in confronting relation to the seat back to provide a forward storage space between the seat bottom and the front occupant support, and to a second storage mode, in which the seat bottom is arranged in confronting relation to the front occupant support and the seat back is spaced apart from the rear wall to provide a rear storage space between the seat back and the rear wall.

Clause 5. The vehicle of clause 4, any other clause, or any suitable combination of clauses, wherein the rear occupant support further includes a storage shelf coupled between the seat back of the rear occupant support and the rear wall when the rear occupant support is in the second storage mode.

Clause 6. The vehicle of clause 5, any other clause, or any suitable combination of clauses, wherein the seat back includes a first plurality of vertically-spaced shelf supports arranged along a rearward-facing surface of the seat back and the rear wall includes a second plurality of vertically-spaced shelf supports arranged along a forward-facing surface of the rear wall, and wherein the storage shelf is repositionable along the first and second plurality of vertically-spaced shelf supports to adjust a vertical height of the storage shelf relative to the floor.

Clause 7. The vehicle of clause 5, any other clause, or any suitable combination of clauses, wherein the storage shelf is mounted to the rear wall for pivotable movement relative to the rear wall about a shelf pivot axis from a stored position, in which the storage shelf extends generally parallel with the rear wall, to a deployed position, in which the storage shelf extends between and interconnects the rear wall and the seat back.

Clause 8. The vehicle of clause 7, any other clause, or any suitable combination of clauses, wherein a first end of the storage shelf is slidable relative to the rear wall to adjust a height of the first end relative to the floor and the seat back includes a plurality of vertically-spaced shelf supports arranged along a rearward-facing surface of the seat back, the storage shelf including a second end opposite the first end that is configured to engage one of the vertically-spaced shelf supports in the deployed position.

Clause 9. The vehicle of clause 5, any other clause, or any suitable combination of clauses, wherein the storage shelf includes a first shelf section and a second shelf section movable relative to the first shelf section to provide a variable-length shelf surface.

Clause 10. The vehicle of clause 9, any other clause, or any suitable combination of clauses, wherein the second shelf section is slidable relative to the first shelf section to increase and decrease a length of the shelf surface.

Clause 11. The vehicle of clause 9, any other clause, or any suitable combination of clauses, wherein the second shelf section is pivotable relative to the first shelf section to increase and decrease a length of the shelf surface.

Clause 12. A rear row occupant support for a vehicle, the rear occupant support includes a seat bottom arranged to overlie a floor of the vehicle.

Clause 13. The occupant support of clause 12, any other clause, or any suitable combination of clauses, further includes a seat back coupled to the seat bottom and arranged to extend upwardly away from the floor, and Clause 14. The occupant support of clause 13, any other clause, or any suitable combination of clauses, further includes a seat mode-change system configured to couple the rear occupant support to the floor, the seat mode-change system including a foundation track coupled to the floor and arranged to extend longitudinally along the floor, a foundation mount coupled to the foundation track and at least one of the seat bottom and the seat back, and a foundation motion-blocker configured to block forward and aft movement of the foundation mount along the foundation track in a locked arrangement and allow forward and aft movement of the foundation mount along the foundation track in an unlocked arrangement, Clause 15. The occupant support of clause 14, any other clause, or any suitable combination of clauses, wherein the seat mode-change system is configured to allow movement of the rear occupant support relative to the floor between a passenger support mode, in which the seat bottom is arranged generally horizontally relative to the floor and the seat back extends upwardly away from the seat bottom and the floor, to a first storage mode, in which the foundation mount is positioned at a first end of the foundation track and the seat bottom is arranged in confronting relation to the seat back, and to a second storage mode, in which the foundation mount is arranged at an opposite, second end of the foundation track and the seat bottom is arranged in confronting relation to the seat back to provide a rear storage space behind the seat back.

Clause 16. The occupant support of clause 15, any other clause, or any suitable combination of clauses, further comprising a storage shelf coupled between the seat back of the rear occupant support and a frame of the vehicle when the rear occupant support is in the second storage mode.

Clause 17. The occupant support of clause 16, any other clause, or any suitable combination of clauses, wherein the seat back includes a first plurality of vertically-spaced shelf supports arranged along a rearward-facing surface of the seat back and the frame of the vehicle includes a second plurality of vertically-spaced shelf supports, and wherein the storage shelf is repositionable along the first and second plurality of vertically-spaced shelf supports to adjust a vertical height of the storage shelf relative to floor.

Clause 18. The occupant support of clause 16, any other clause, or any suitable combination of clauses, wherein the storage shelf is mounted to the frame of the vehicle for pivotable movement relative to the frame of the vehicle about a shelf pivot axis from a stored position, in which the storage shelf extends generally parallel with the frame of the vehicle, to a deployed position, in which the storage shelf extends between and interconnects the frame of the vehicle and the seat back.

Clause 19. The occupant support of clause 18, any other clause, or any suitable combination of clauses, wherein a first end of the storage shelf is slidable relative to the frame of the vehicle to adjust a height of the first end relative to the floor and the seat back includes a plurality of vertically-spaced shelf supports arranged along a rearward-facing surface of the seat back, the storage shelf including a second end opposite the first end that is configured to engage one of the vertically-spaced shelf supports in the deployed position.

Clause 20. The occupant support of clause 17, any other clause, or any suitable combination of clauses, wherein the storage shelf includes a first shelf section and a second shelf section movable relative to the first shelf section to provide a variable-length shelf surface.

Clause 21. The occupant support of clause 20, any other clause, or any suitable combination of clauses, wherein the second shelf section is slidable relative to the first shelf section to increase and decrease a length of the shelf surface.

Clause 22. The occupant support of clause 20, any other clause, or any suitable combination of clauses, wherein the second shelf section is pivotable relative to the first shelf section to increase and decrease a length of the shelf surface.

Clause 23. A rear row occupant support for a vehicle, the rear occupant support includes a seat bottom arranged to overlie a floor of the vehicle.

Clause 24. The occupant support of clause 23, any other clause, or any suitable combination of clauses, further includes a seat back coupled to the seat bottom and arranged to extend upwardly away from the floor, Clause 25. The occupant support of clause 24, any other clause, or any suitable combination of clauses, further includes a seat mode-change system configured to couple the rear occupant support to the floor, the seat mode-change system including a foundation track coupled to the floor and arranged to extend longitudinally along the floor, a foundation mount coupled to the foundation track and at least one of the seat bottom and the seat back, and a foundation motion-blocker configured to block forward and aft movement of the foundation mount along the foundation track in a locked arrangement and allow forward and aft movement of the foundation mount along the foundation track in an unlocked arrangement, and Clause 26. The occupant support of clause 25, any other clause, or any suitable combination of clauses, further includes a storage shelf coupled between the seat back of the rear occupant support and a frame of the vehicle when the foundation mount is arranged at a forward end of the foundation track and the seat bottom is arranged in confronting relation to the seat back.

Clause 27. The occupant support of clause 26, any other clause, or any suitable combination of clauses, wherein the seat back includes a first plurality of vertically-spaced shelf supports arranged along a rearward-facing surface of the seat back and the frame of the vehicle includes a second plurality of vertically-spaced shelf supports, and wherein the storage shelf is repositionable along the first and second plurality of vertically-spaced shelf supports to adjust a vertical height of the storage shelf relative to floor.

Clause 28. The occupant support of clause 26, any other clause, or any suitable combination of clauses, wherein the storage shelf is mounted to the frame of the vehicle for pivotable movement relative to the frame of the vehicle about a shelf pivot axis from a stored position to a deployed position, in which the storage shelf extends between and interconnects the frame of the vehicle and the seat back.

Clause 29. The occupant support of clause 26, any other clause, or any suitable combination of clauses, wherein a first end of the storage shelf is slidable relative to the frame of the vehicle to adjust a height of the first end relative to the floor and the seat back includes a plurality of vertically-spaced shelf supports arranged along a rearward-facing surface of the seat back, the storage shelf including a second end opposite the first end that is configured to engage one of the vertically-spaced shelf supports in the deployed position.

The invention claimed is:
1. A vehicle comprising
  a vehicle frame including a floor, a front dash, and a rear wall to define a passenger compartment between the front dash and the rear wall and above the floor,
  a front occupant support positioned directly aft of the front dash within the passenger compartment, and
  a rear occupant support positioned directly forward of the rear wall between the front occupant support and the rear wall within the passenger compartment, the rear occupant support including a seat bottom arranged to overlie the floor, a seat back coupled to the seat bottom and arranged to extend upwardly away from the floor in front of the rear wall, and a seat mode-change system configured to couple the rear occupant support to at least one of the floor and the rear wall, the seat mode-change system including a foundation track coupled to the floor and arranged to extend longitudinally away from the rear wall toward the front occupant support, a foundation mount coupled to the foundation track and at least one of the seat bottom and the seat back, and a foundation motion-blocker configured to block forward and aft movement of the foundation mount along the foundation track in a locked arrangement and allow forward and aft movement of the foundation mount along the foundation track in an unlocked arrangement,
  wherein the seat mode-change system is configured to allow movement of the rear occupant support relative to the floor and the rear wall between a passenger support mode, in which the seat bottom is arranged generally horizontally relative to the floor and the seat back extends upwardly away from the seat bottom and the floor, to a first storage mode, in which the seat bottom is arranged generally vertically relative to the floor in confronting relation to the seat back to provide a forward storage space between the seat bottom and the front occupant support, and to a second storage mode, in which the seat bottom is arranged in confronting relation to the front occupant support and the seat back is spaced apart from the rear wall to provide a rear storage space between the seat back and the rear wall,
  wherein the rear occupant support further includes a storage shelf coupled between the seat back of the rear occupant support and the rear wall when the rear occupant support is in the second storage mode, wherein the storage shelf is mounted to the rear wall for pivotable movement relative to the rear wall about a shelf pivot axis from a stored position, in which the storage shelf extends generally parallel with the rear wall, to a deployed position, in which the storage shelf extends between and interconnects the rear wall and the seat back, and wherein a first end of the storage shelf is slidable relative to the rear wall to adjust a height of the first end relative to the floor and the seat back includes a plurality of vertically-spaced shelf supports arranged along a rearward-facing surface of the seat back, the storage shelf including a second end opposite the first end that is configured to engage one of the vertically-spaced shelf supports in the deployed position.

2. A rear row occupant support for a vehicle, the rear occupant support comprising a seat bottom arranged to overlie a floor of the vehicle, a seat back coupled to the seat bottom and arranged to extend upwardly away from the floor, and a seat mode-change system configured to couple the rear occupant support to the floor, the seat mode-change system including a foundation track coupled to the floor and arranged to extend longitudinally along the floor, a foundation mount coupled to the foundation track and at least one of the seat bottom and the seat back, and a foundation motion-blocker configured to block forward and aft movement of the foundation mount along the foundation track in a locked arrangement and allow forward and aft movement of the foundation mount along the foundation track in an unlocked arrangement, wherein the seat mode-change system is configured to allow movement of the rear occupant support relative to the floor between a passenger support mode, in which the seat bottom is arranged generally horizontally relative to the floor and the seat back extends upwardly away from the seat bottom and the floor, to a first storage mode, in which the foundation mount is positioned at a first end of the foundation track and the seat bottom is arranged in confronting relation to the seat back, and to a second storage mode, in which the foundation mount is arranged at an opposite, second end of the foundation track and the seat bottom is arranged in confronting relation to the seat back to provide a rear storage space behind the seat back, wherein the rear row occupant support further includes a storage shelf coupled between the seat back of the rear occupant support and a frame of the vehicle when the rear occupant support is in the second storage mode, wherein the storage shelf is mounted to the frame of the vehicle for pivotable movement relative to the frame of the vehicle about a shelf pivot axis from a stored position, in which the storage shelf extends generally parallel with the frame of the vehicle, to a deployed position, in which the storage shelf extends between and interconnects the frame of the vehicle and the seat back, and wherein a first end of the storage shelf is slidable relative to the frame of the vehicle to adjust a height of the first end relative to the floor and the seat back includes a plurality of vertically-spaced shelf supports arranged along a rearward-facing surface of the seat back, the storage shelf including a second end opposite the first end that is configured to engage one of the vertically-spaced shelf supports in the deployed position.

3. A rear row occupant support for a vehicle, the rear occupant support comprising a seat bottom arranged to overlie a floor of the vehicle, a seat back coupled to the seat bottom and arranged to extend upwardly away from the floor, a seat mode-change system configured to couple the rear occupant support to the floor, the seat mode-change system including a foundation track coupled to the floor and arranged to extend longitudinally along the floor, a foundation mount coupled to the foundation track and at least one of the seat bottom and the seat back, and a foundation motion-blocker configured to block forward and aft movement of the foundation mount along the foundation track in a locked arrangement and allow forward and aft movement of the foundation mount along the foundation track in an unlocked arrangement, and a storage shelf coupled between the seat back of the rear occupant support and a frame of the vehicle when the foundation mount is arranged at a forward end of the foundation track and the seat bottom is arranged in confronting relation to the seat back, wherein a first end of the storage shelf is slidable relative to the frame of the vehicle to adjust a height of the first end relative to the floor and the seat back includes a plurality of vertically-spaced shelf supports arranged along a rearward-facing surface of the seat back, the storage shelf including a second end opposite the first end that is configured to engage one of the vertically-spaced shelf supports in a deployed position.

4. The occupant support of claim 3, wherein the storage shelf is mounted to the frame of the vehicle for pivotable movement relative to the frame of the vehicle about a shelf pivot axis from a stored position to the deployed position, in which the storage shelf extends between and interconnects the frame of the vehicle and the seat back.

* * * * *